Figure 1:
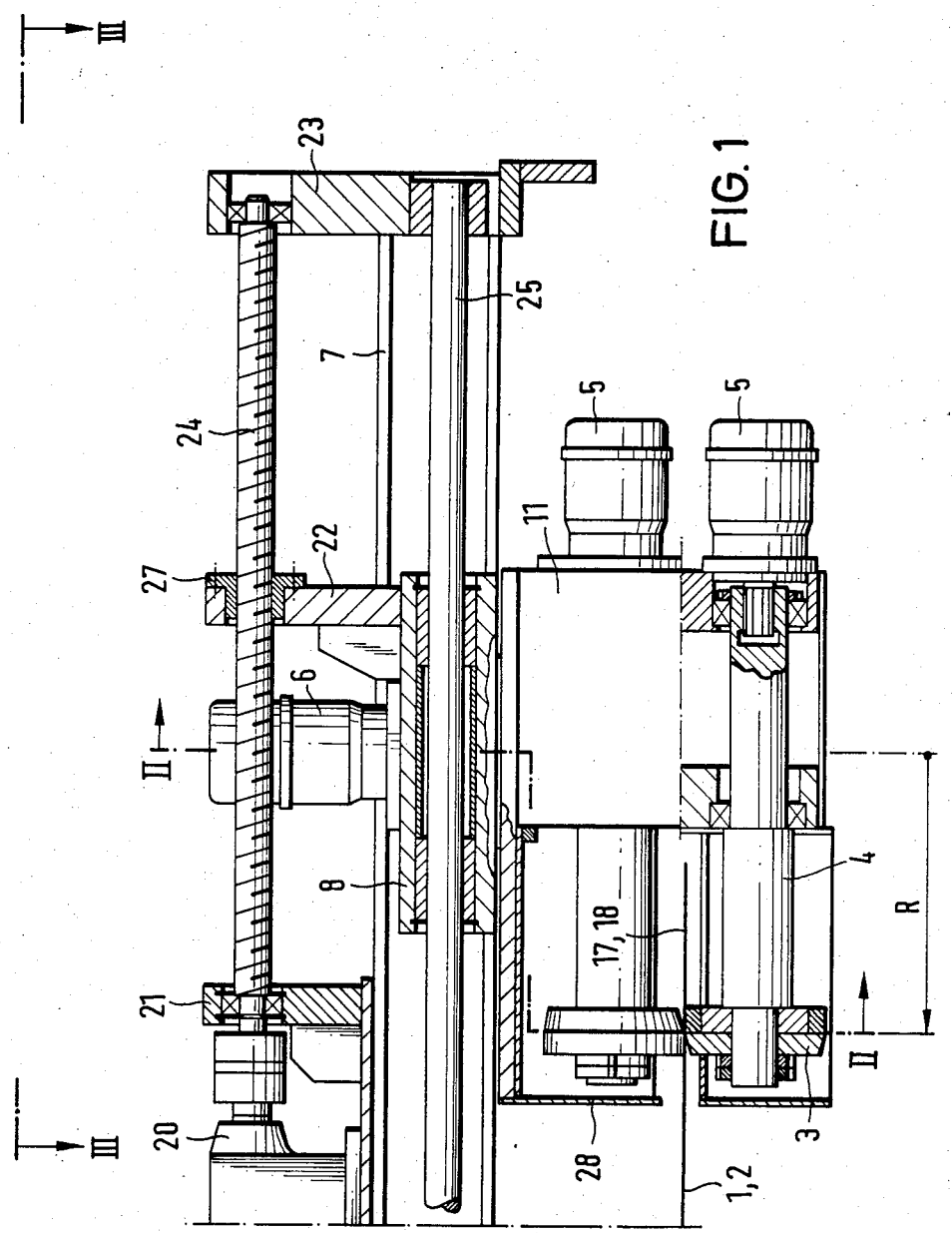

United States Patent [19]

Oberländer et al.

[11] Patent Number: 4,638,701

[45] Date of Patent: Jan. 27, 1987

[54] SHEARS, ESPECIALLY CIRCULAR KNIFE SHEARS

[75] Inventors: Karol H. Oberländer, Mainleus; Norbert Umlauf, Haferkamp 64, D-5800 Hagen 1, both of Fed. Rep. of Germany

[73] Assignee: Norbert Umlauf, Hagen, Fed. Rep. of Germany

[21] Appl. No.: 688,302

[22] Filed: Jan. 2, 1985

[30] Foreign Application Priority Data

Jan. 4, 1984 [DE] Fed. Rep. of Germany ....... 3400122

[51] Int. Cl.$^4$ ............................................. B23D 31/04
[52] U.S. Cl. ....................................... 83/490; 83/496; 83/499; 83/564
[58] Field of Search ................. 83/490, 500, 564, 496, 83/499; 144/24

[56] References Cited

U.S. PATENT DOCUMENTS

| 2,003,049 | 5/1935 | Hull | 83/490 X |
| 3,815,458 | 6/1974 | Jirousek | 83/490 X |
| 4,358,978 | 11/1982 | Lawson | 83/479 X |

Primary Examiner—James M. Meister
Attorney, Agent, or Firm—Toren, McGeady and Goldberg

[57] ABSTRACT

To enable band treatment installations to be continuously operated, the end of the band (1) passing through is welded with the start of a new band (2). In the joining of bands (1, 2) of different widths or when a band is offset, annoying corners or lateral projections frequently cannot be avoided. A shears for notching these regions or for cutting out segments (17) and strips (18) by means of a knife pair travelling into the band consists of an upper and a lower circular knife (3, 40) and possesses a pivoting drive (6) for moving the knife pair along a curve.

12 Claims, 5 Drawing Figures

SHEARS, ESPECIALLY CIRCULAR KNIFE SHEARS

This invention relates to a shears for cutting out segments and strips from metal bands by means of a knife pair travelling into the band, especially of an upper and a lower circular knife.

For the uninterrupted operation of metal band treatment installations, the bands must be supplied in endless form. This can be achieved by joining the end of a band guided through the band treatment installation to the start of a new band either by butt welding in the case of thick bands or by lap welding for thinner bands. Where bands of different widths are joined or a band is offset, it is not possible to avoid annoying lateral projections or corners in the region of the weld joint or seam, which for example damage plastics coatings and other coatings of band guiding and drive rollers and also endanger machine parts coming into contact therewith, furnace linings and coatings in chemical baths. Added to this is the fact that metal band treatment installations are operated at relatively high specific tensions and considerable speeds, so that frequently even a small incipient crack can lead to tearing of the metal band and thus cause expensive faults and defects; the regions comprising incipient cracks must therefore be removed from the band.

In installations for the treatment of thicker bands, it is known to provide behind the welding machine either notching punches or burners, for removing these regions of the band. The punches are disadvantageous because, on account of the required large forces and their heavy, bulky construction, they are not only expensive but also require considerable maintenance. The large space requirement usually does not permit them to be added to existing plants. The regrinding of the circular punching knives necessary from time to time is, moreover, very expensive and requires special grinding machines, particularly when spiral knives must be reground, which moreover can only be done intermittently.

It is also known to get the operator to carry out the band cutouts for thinner bands using so-called nibble machines. This procedure is very liable to accidents and moreover is time consuming, because the band cut-outs are required on both sides. When calculating the time required for changing a band, the times for the notching, i.e. cutting-out of the band segments, and the time for welding must be added together, because the cutting-out follows the welding.

The task underlying the present invention is to create a simple, inexpensive, operationally reliable and space-saving shears which avoids the aforementioned disadvantages, for the removal of projecting corners and/or incipient cracks and to cut out band segments, band strips or band curved strips.

This task is achieved according to the present invention by a shears of the initially mentioned type, comprising a pivoting drive which moves the knife pair along a curve. For this purpose, a knife carrier may preferably be mounted with the knife pair rotatably in a linearly movable guide block of a shears frame. When the knife pair of a shears disposed on each side of the band is pivoted, band segments determined by the form of the curve and thus projecting corners and edges present in the region of the weld seams or incipient cracks in the edge region of the band passing through the treatment installation, can be cut out.

The knife carrier advantageously projects with a vertical bearing journal into a seating of the guide block and a motor engages from above into the journal by a drive shaft. When the guide block is adjusted transversely to the direction of travel of the band, i.e. is moved to a greater or lesser distance from the edge of the band, thus enabling the width of the cut-out to be determined, the motor connected with the block and the knife carrier participate in the adjustment movement into the final operating position. Thereafter, when the motor is set in operation, only the knife carrier pivots out of the starting position along a circular arc of 180° into an opposite final position, then back again.

To enable the pivoting radius of the knife housing with the knife pair disposed therein to be varied also, the bearing journal may be disposed in a block of the knife carrier rotatably mounted relative to the guide block of the shears frame and the knife carrier may be movable linearly relative to the blocks. In this way the pivot point and curved track of the knife carrier can be varied independently of an approach setting of the blocks and, if necessary, an undulating form of the cut-out band strip can be achieved.

The knives may be free running or at least one knife may be driven. Preferably, the cutting speeds of the knives and the pivoting speed of the knife carrier are adapted to each other. Apart from cutting by means of driven knives, the band may also be cut by the pivoting of the knife head and combined, i.e. a driven cutting knife is assisted in cutting by the pivoting of the knife head. The pivoting drive provides the entire cutting power in the case of free running knives, or inreases a possibly inadequate cutting power of driven knives. In particular in the case of knives which do not cut through the band, which can lead to running over or stopping of the knives, the assistance to cutting provided by the pivoting drive is particularly advantageous. The combined operation with superimposed cutting powers makes possible cutting even of thick bands with relatively small knife diameters. The cutting force remains very small. The shears can moreover also be operated with advantage when either the lower or the upper knife is straight, i.e. is constructed with a straight cutting edge.

For edge trimming a sheet metal band, the knife carrier is fixed in a position with knives cutting parallel to the longitudinal axis of the metal band. The knife carrier is simply rotated from its starting position through 90° and then locked; in this position the knives revolve parallel to the direction of travel of the band. The shears can now be used for trimming, that is for removing frequently damaged band edges especially at the start and end of a band. After the trimming, the knife carrier can either be swung back into the starting position or swung through into the opposite end position.

Advantageously, at least the inwardly cutting, lower knife may be of conical form and mounted on a rotary axis. By contrast to circular knives which are opposite to each other in a vertical plane, the bearing surface of the band is exposed even during cutting, or is reduced immediately at the point of cut, thus enabling clean cut edges to be obtained and undulating edges to be avoided. The conical form may be produced by appropriate grinding of the narrow edge and, if necessary, may have different inclinations of the ground flanks.

By means of the drive shaft of one knife, which is journalled in an eccentric casing, the depth of cut can be adjusted, and by means of an axially displacable drive shaft the gap or clearance between the upper and lower knives can be adjusted.

By means of a spring package disposed on the axially displaceable drive shaft, a certain amount of clearance can be taken up.

Figure 2:
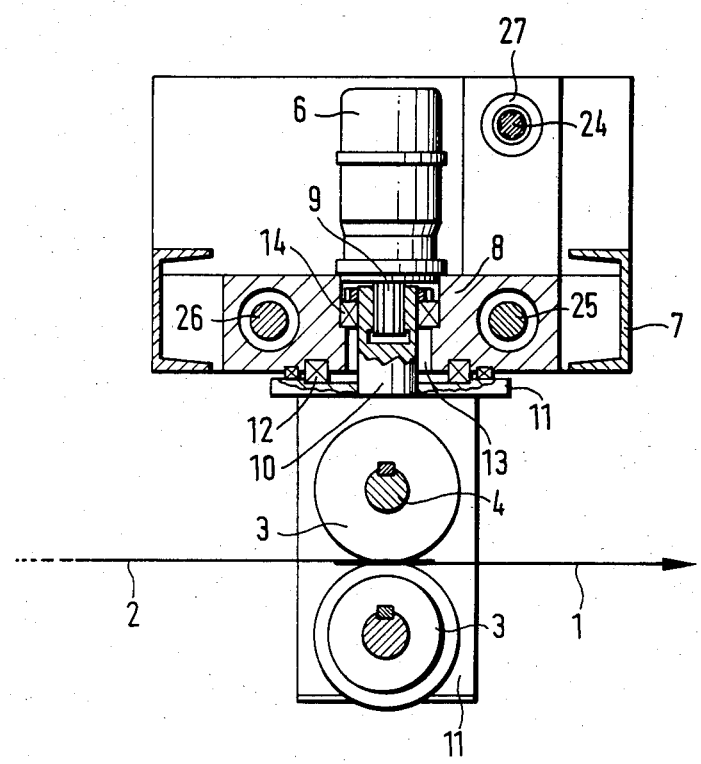
Figure 3:
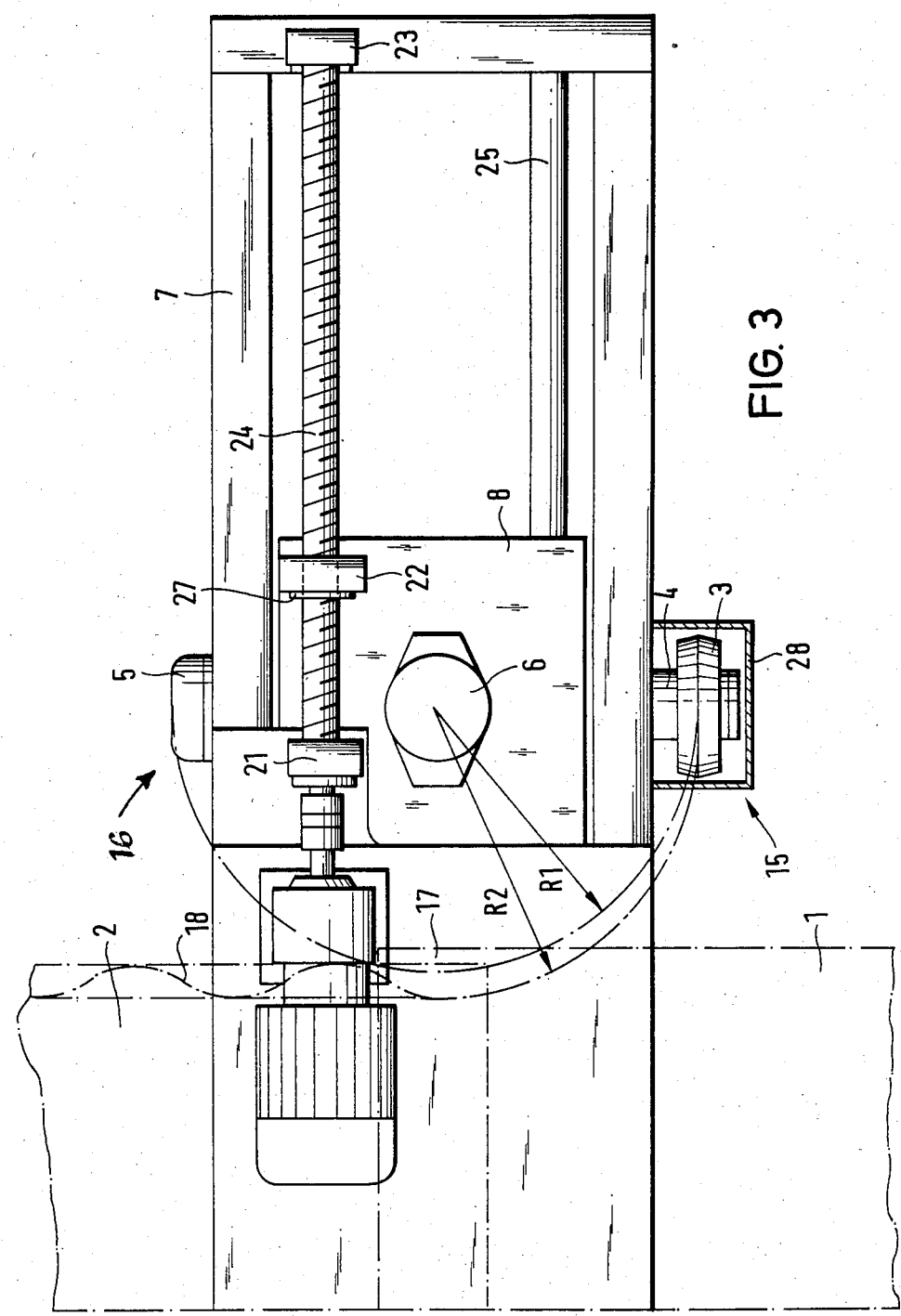
Figure 4:
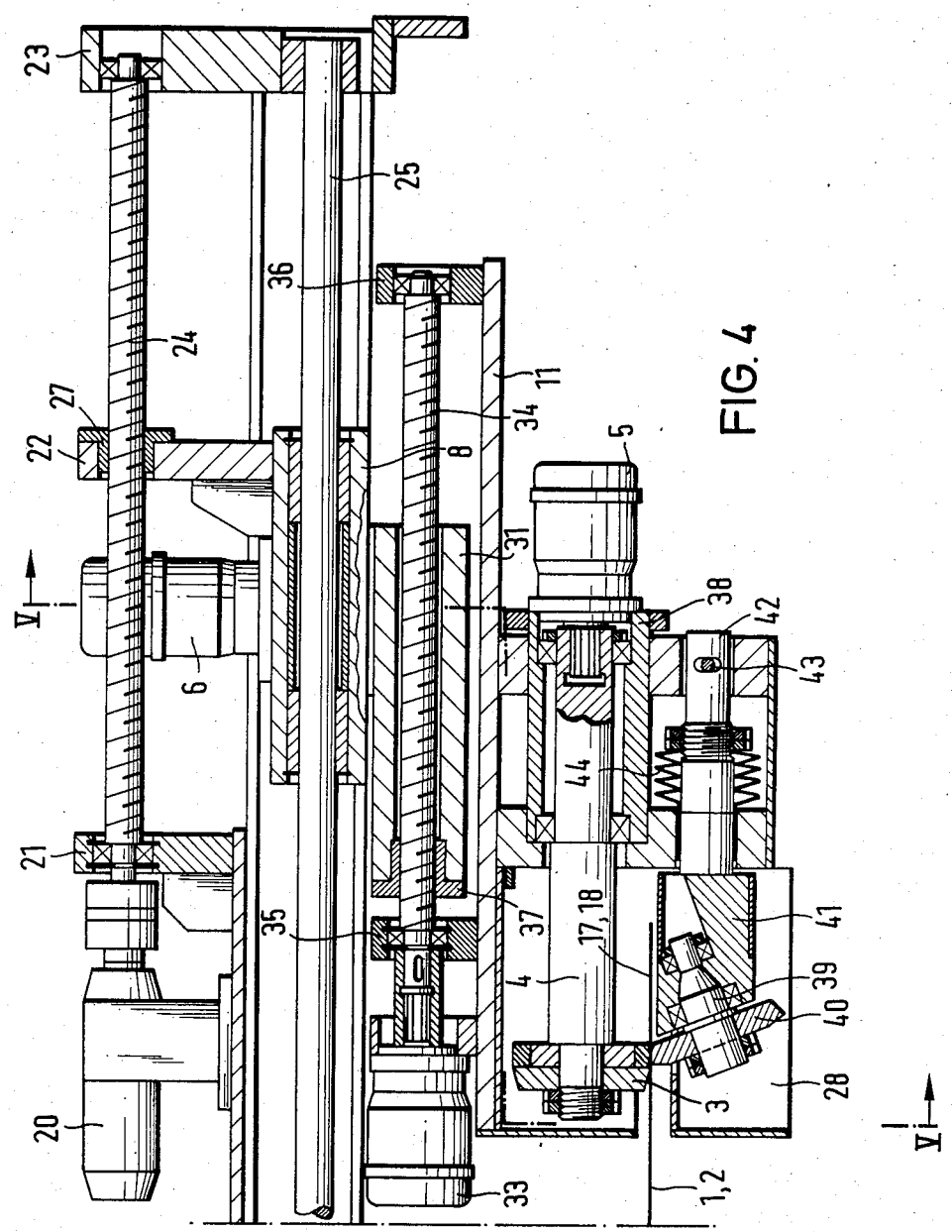
Figure 5:
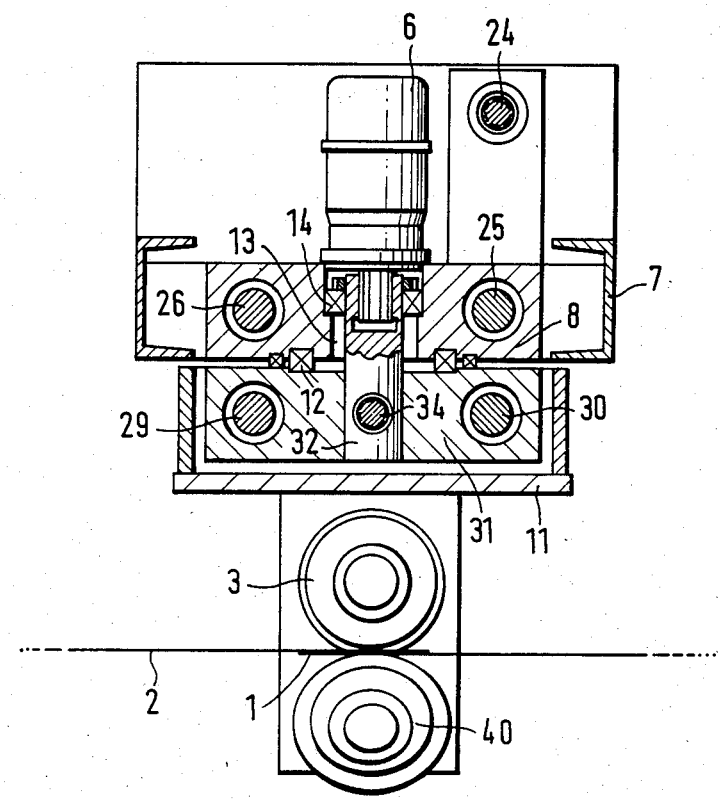

The invention is explained in more detail below with reference to the examples of embodiment of a circular knife shears illustrated in the drawings. The drawings show:

FIG. 1 A circular knife shears shown schematically partly in section in side view;

FIG. 2 The subject of FIG. 1 along the line II—II;

FIG. 3 A plan on the line III—III in FIG. 1;

FIG. 4 A shears having an additional device for adjusting the pivot radius, shown in side view and section, and FIG. 5 The subject of FIG. 4 sectioned along the line V—V.

The end of a band 1, passing through a band treatment installation, not shown, and the start of the following band 2 are connected together, according to FIG. 3, by lap welding by means of a welding apparatus, not shown. For cutting out or edge-trimming of the edges of the metal bands 1, 2, especially in the region of the weld seam, a shears comprises two circular knives 3, disposed vertically one above another. These circular knives are driven via knife shafts 4 by hydraulic motors 5. The circular knives 3, both of which are driven in FIG. 1 and only the upper one is driven in FIG. 4, can be adjusted by means of a pivoting drive 6, constructed as hydraulic motor.

For this purpose, the pivoting motor 6 is bolted onto a guide block 8, linearly movable in a shears frame 7, and engages with a splined shaft 9 into a journal 10 of a knife carrier 11, which seats the circular knives 3 and their shafts 4 including the motors 5. The knife carrier 11 is rotatably guided, on the one hand by means of bearings 12 on the lower side of the guide block 8, and on the other hand in a seating 13 of the block 8 by means of a bearing 14 which seats the journal 10. The rotation of the splined shaft 9 of the motor 6 is transmitted by the journal 10 to the knife carrier 11, which is pivoted from the starting position 15 illustrated in FIG. 3 along a curve corresponding to a radius varying from R1 to R2, into an opposite end position 16 and then back again into the starting position 15. A segment 17 or an undulating curved strip 18 is thereby cut from the edge of the welded together metal strips 1, 2. The segments or curved strips fall into a scrap container, not shown.

Before the pivoting takes place, the knife carrier 11 is adjusted to the required depth of entry into the metal band 1, 2, i.e. to the desired width of the segment 17 or curved strip to be cut out. For this purpose, a motor 20 is mounted in the shears frame 7, which motor linearly adjusts the guide block 8, slidable on bar guides 25, 26 (FIG. 2), by means of a spindle 24 journalled in bearing blocks 21, 22, 23. The central bearing block 22 is fixed to the guide block 8, the rotation of the spindle 24 being converted by a spindle nut 27 of the central bearing block 22 into a linear movement of the guide block 8.

For additional adjustment of the radius for the pivoting movement of the knife carrier 11 with the circular knives 3 disposed therein and covered by a protective hood 28, there is situated according to FIGS. 4 and 5, beneath the guide block 8, a block 31 of the knife carrier 11 guided on round bars 29, 30. The block 31 projects with a journal 32 into the seating 13 of the guide block 8. The journal 32 is seated in the seating 13 by the bearing 14, while the bearing 12 is disposed between the blocks 8, 31. In operation, the motor 6, acting through the splined shaft 9 engaging into the journal 32, pivots the lower block 31 and the knife carrier 11 connected therewith.

For adjusting different radii, the knife carrier 11 is guided linearly movable relative to the blocks 8, 31. This is achieved by a motor 33, which drives a spindle 34, which passes through the journal 32 and is itself journalled in bearing blocks 35, 36 of the knife carrier 11. The rotation of the spindle 34 is transmitted by a spindle nut 37 fixed in the block 31 via the blocks 35, 36 to the knife carrier 11 as a linear adjustment movement.

For setting the cutting depth of the circular knives 3, the knife shaft 4 of the upper circular knife is journalled in an eccentric casing or bushing 38, which, for example, can be adjusted by an operator or by a motor. (FIG. 4). In the construction of the shears shown in FIG. 4, the lower knife 40 is of conical form and is mounted on a rotary axis 39 inclined at approximately 20°.

The conical knife 40 is journalled with the inclined rotary axis 39 in a bearing head 41, which continues into a shaft 42, which is not driven but journalled freely rotating in the knife carrier 11. The shaft 42 can be axially displaced by means of an eccentric adjustment 43 and thus the gap or air space between the knives 3, 40 can be set. A spring package 44 disposed on the shaft 42 and consisting of cup springs ensures take-up of clearance during the setting, the system being always firmly positioned on one side.

We claim:

1. Shears for cutting out segments and strips from metal bands movable along a generally horizontal rectilinear path of travel, comprising a linearly displaceable guide block, said guide block includes a knife carrier, an upper and a lower circular knife mounted on said knife carrier and arranged to cooperate and cut the metal bands, a pivoting drive mounted on said guide block and in engagement with said knife carrier for displacing said upper and lower circular blades spaced outwardly from said pivoting drive along a generally horizontal arcuate path from a location spaced laterally from the path of travel of the metal bands to a location in the path of travel of the metal bands for cutting the metal bands, said guide block having a recess therein extending upwardly from said knife carrier, a vertical journal secured to said knife carrier and extending upwardly into the recess, said pivoting drive includes a pivoting motor secured to and extending upwardly from said guide block and said pivoting motor includes a splined shaft extending downwardly from said motor and disposed in engagement with said journal for pivoting said knife carrier.

2. Shears according to claim 1, characterized in that a shears frame (7) supports said guide block (8) for linear movement, the journal (10) is disposed in a block (31) of the knife carrier (11) rotatably mounted relative to the guide block (8) in the shears frame (7), and the knife carrier (11) is linearly movable relative to the blocks (7, 31).

3. Shears according to claim 1 or 2, characterized by at least one driven knife (3; 40).

4. Apparatus according to claim 1 or 2, characterized by non-driven knives (3; 40).

5. Shears according to claim 3, characterized in that the cutting speed of the knives (3; 40) and the pivoting speed of the knife carrier (11) are adapted to each other.

6. Shears according to claim 5, characterized in that the knife carrier (11) is fixed in a position with knives cutting parallel to the longitudinal axis of the metal band (1, 2).

7. Shears according to claim 1 or 2, characterized by conical knives (40).

8. Shears according to claim 7, characterized in that the inwardly cutting, lower knife (40) is of conical form.

9. Shears according to claim 8, characterized by an inclined axis of rotation (39) of the lower knife (40).

10. Shears according to claim 1 or 2, characterized in that the knife shaft (4) of one knife (3) is journalled in an eccentric casing (38).

11. Shears according to claim 1 or 2, characterized in that one knife possesses an axially displaceable shaft (42).

12. Shears according to claim 1 or 2, characterized by a spring package (44) disposed on the axially displaceable shaft (42).

* * * * *